April 25, 1967    J. C. MARSHALL ET AL    3,316,069
REFRACTORY METAL BRAZING PRODUCT AND PROCESS
Filed Feb. 20, 1964
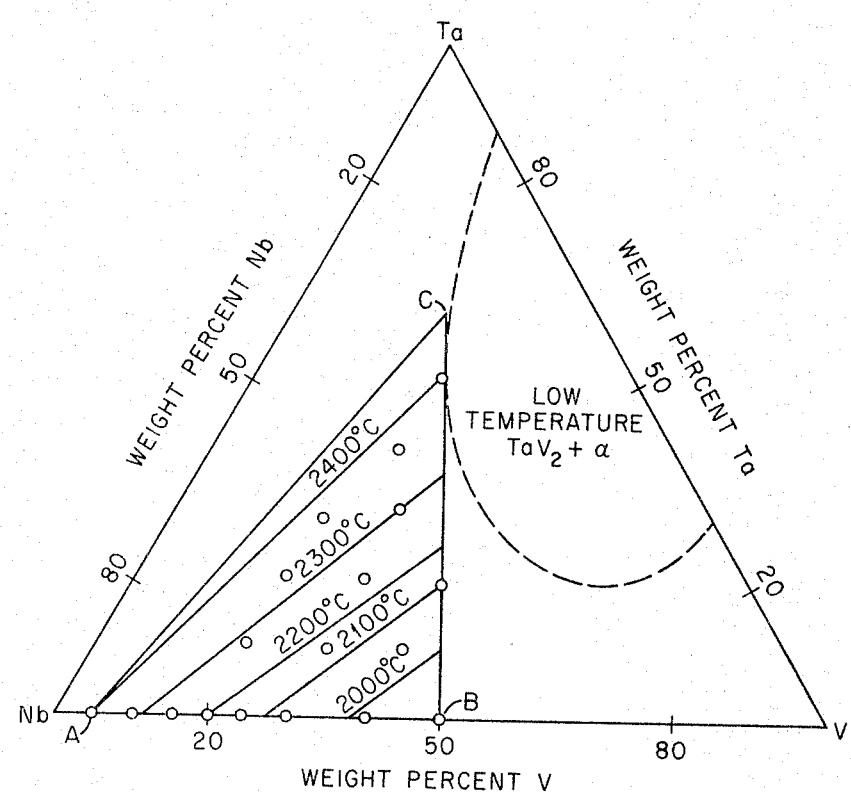
INVENTORS.
James C. Marshall
James A. McGurty
George Korton
BY
ATTORNEY.

United States Patent Office 3,316,069
Patented Apr. 25, 1967

3,316,069
REFRACTORY METAL BRAZING PRODUCT AND PROCESS
James C. Marshall, James A. McGurty, and George Korton, Cincinnati, Ohio, assignors to the United States of America as represented by the United States Atomic Energy Commission
Filed Feb. 20, 1964, Ser. No. 346,361
2 Claims. (Cl. 29—198)

Our invention relates to brazing of refractory metals. The refractory metals tungsten, molybdenum, niobium, tantalum and their alloys are useful for numerous high-temperature applications in the nuclear energy and space fields. Many of these applications require sealing or closure joints and/or structural joints for attachment to support hardware. Refractory metals have been joined by welding and diffusion bonding as well as brazing, but numerous joint configurations and tolerances are encountered such that brazing is the only practical mehod Previous brazing alloys have been effective for relatively low brazing and service temperatures, but not for temperatures in the range of interest for certain nuclear reactor components, that is, 1950° C. to 2500° C. For example, previous attempts to braze tantalum at these temperatures have been characterized by severe base metal erosion, joint embrittlement, and unfavorable remelt characteristics.

It is desired to provide a brazing alloy system which will allow selection of a specific brazing temperature within the range of 1950° C. to 2500° C. Other features desired for the brazing alloy system are the absence of intermediate phases at the refractory metal joint, low erosion of the base metal and rapid increase in the remelt temperature of the joint.

It is therefore an object of our invention to provide a method of joining refractory metals.

Another object is to provide a brazing alloy system for brazing tungsten, molybdenum, tantalum, niobium and their alloys at a selected temperature within the range of 1950° C. to 2500° C.

Other objects and advantages of our invention will be apparent from the following detailed description and claims.

In accordance with our invention tungsten, tantalum, molybdenum, niobium and alloys containing a predominant proportion thereof are joined by brazing at a temperature of 1950° C. to 2500° C. with a brazing alloy of the composition 4 to 50 weight percent vanadium, 20 to 96 weight percent niobium and 0 to 60 weight percent tantalum, the composition of said alloy being further limited to the area bounded by the triangle ABC in the accompanying figure. This alloy system allows selection of a specific brazing temperature within the stated range. No intermediate phases are formed at the joint interface, and erosion of the base metal is minimized. The properties of these brazing alloys most nearly match tantalum and niobium base-metal properties so that they are of most interest for joining tantalum and niobium.

Brazing alloy compositions within the scope of our invention are depicted graphically by the triangle ABC in the accompanying figure, which is a ternary diagram of the niobium-tantalum-vanadium system. Lines of constant brazing temperature are depicted by diagonal lines within the triangle. Compositions for a given brazing temperature may be selected by reference to these lines. The ternary diagram also indicates the region wherein a tantalum-vanadium intermetallic compound is formed at low temperatures, compositions in this region being unusable because of the cracking tendency of the brazed joint.

In selecting a brazing alloy composition it is preferred to use the composition that most nearly matches the base-metal for the desired brazing temperature. Binary niobium-vanadium alloys are preferred for joining niobium and its alloys and ternary niobium-tantalum-vanadium alloys are preferred for joining tantalum and its alloys. For brazing tantalum for service at temperatures above 2300° C., alloys within the above-mentioned triangle and having the composition 20 to 50 weight percent tantalum, 30 to 70 weight percent niobium and 10 to 25 weight percent vanadium are preferred. The remelt temperature is rapidly increased with the presence of tantalum so that high-temperature service is facilitated.

All of the brazing alloys within the scope of our invention may be fabricated into usable form such as sheet or wire by cold working or into powder by hydriding and pulverizing, and conventional brazing techniques may be employed. Exclusion of oxygen during brazing is required, and an inert or reducing atmosphere may be employed for this purpose. The parts to be joined are positioned with the brazing alloy at the interface and the resulting assembly is heated to the brazing temperature for the particular alloy. Complete flow of the brazing alloy at the joint surface is normally obtained by holding at temperature for a period of about 5 minutes. Larger or thicker parts may require a longer heating period.

The brazing alloy system and method described above is applicable to joining tungsten, molybdenum, tantalum, niobium and alloys comprising a predominant proportion, that is, over 50 weight percent, of these metals to themselves and one another. Examples of alloys which may be joined by this means are tungsten—26 weight percent rhenium and tantalum—10 weight percent tungsten.

Our invention is further illustrated by the following examples.

*Example I*

A series of brazing tests was conducted using alloys in the system described above. In each test a sheet of brazing alloy was placed adjacent the joint line of a tantalum T section. The T section assembly was then heated in a resistance furnace to 1650° C. in helium. The helium was purged out with hydrogen at this temperature and the T section was heated to a predetermined temperature, held for five minutes, and cooled to 1650° C. in the hydrogen atmosphere. At this time the hydrogen was purged by helium and cooling was continued to room temperature. A heating rate of 100° F. per minute was normally maintained. The T sections were examined visually for extent of melting and flow and metallographically for fillet porosity, cracking and erosion. These tests were repeated in 25–50° C. intervals until the brazing temperature was determined.

Further details and the results obtained may be seen by reference to the following table.

TABLE I.—REFRACTORY METAL BRAZING SUMMARY

| No. | Composition (w/o) | Brazing Temp., °C. | Ta | W | Mo | Nb | W-26 w/o Re | Ta-10 w/o W |
|---|---|---|---|---|---|---|---|---|
| 1 | Nb-5V | 2,400 | X | X | X | NR* | X | X |
| 2 | Nb-10V | 2,350 | X | X | X | NR | X | X |
| 3 | Nb-15V | 2,275 | X | X | X | NR | X | X |
| 4 | Nb-20V | 2,200 | X | X | X | X | X | X |
| 5 | Nb-25V | 2,150 | X | X | X | X | X | X |
| 6 | Nb-30V | 2,075 | X | X | X | X | X | X |
| 7 | Nb-40V | 2,000 | X | X | X | X | X | X |
| 8 | Nb-50V | 1,950 | X | X | X | X | X | X |
| 9 | Nb-10Ta-30V | 2,150 | X | X | X | X | X | X |
| 10 | Nb-10Ta-40V | 2,050 | X | X | X | X | X | X |
| 11 | Nb-20Ta-20V | 2,350 | X | X | X | NR | X | X |
| 12 | Nb-20Ta-30V | 2,200 | X | X | X | X | X | X |
| 13 | Nb-20Ta-40V | 2,100 | X | X | X | X | X | X |
| 14 | Nb-30Ta-20V | 2,425 | X | X | NR | NR | X | X |
| 15 | Nb-30Ta-30V | 2,300 | X | X | X | NR | X | X |
| 16 | Nb-40Ta-25V | 2,375 | X | X | X | NR | X | X |
| 17 | Nb-50Ta-25V | 2,425 | X | X | NR | NR | X | X |
| 18 | Nb-10Ta-20V | 2,300 | X | X | X | NR | X | X |

X Indicates satisfactory brazed joint.
* NR-Brazes but is not recommended due to closeness of braze alloy and base metal melting points.

It may be seen from the above that the brazing alloy system described herein is applicable to a variety of refractory metals.

*Example II*

Two niobium-vanadium brazing alloys were applied to tube-to-plate joints. The alloys were Nb–40 wt. percent V, brazed at 1950° C., and Nb–10 wt. percent V, brazed at 2275° C., by the procedure of Example I. The joints consisted of tantalum header plates 0.015 to 0.125 inch thick to which were brazed a large number of small diameter, thin wall tantalum tubes. The brazing alloy was applied as a 0.002 to 0.008 inch sheet machined to match the configuration of the header plate. Successful joints, as judged by visual metallographic and leak detection measurements, were made by this procedure.

The above examples are merely illustrative and are not to be understood as limiting the scope of our invention, which is limited only as indicated by the appended claims.

Having thus described our invention, we claim:

1. The method of joining tungsten, tantalum, molybdenum, niobium and alloys containing a predominant proportion of said metals to themselves and to one another comprising disposing surfaces of the parts to be joined into abutting relationships with a brazing alloy consisting of 4 to 50 weight percent vanadium, 20 to 96 weight percent niobium and 0 to 60 weight percent tantalum, the composition of said brazing alloy falling within the area defined by the triangle ABC in the accompanying figure, heating the resulting assembly to a brazing temperature in the range of 1950° C. to 2500° C. in a non-oxidizing atmosphere and cooling the resulting brazed joint.

2. A composite structure comprising at least two structural portions of refractory material joined to one another by a fused brazing alloy, said refractory material being selected from the group of metals and alloys consisting of the metals tungsten, tantalum, molybdenum, niobium, and alloys containing at least 50 weight percent of at least one of said metals, and said fused brazing alloy having a brazing alloy composition, prior to brazing, consisting of 4 to 50 weight percent vanadium, 20 to 96 weight percent niobium, and up to 60 weight percent tantalum, the joint provided by the fused brazing alloy being characterized by having a melting temperature greater than the melting temperature of the brazing alloy.

References Cited by the Examiner

UNITED STATES PATENTS 3,136,631   6/1964   Wlodek _____ 75—174 X
3,206,305   9/1965   Begley et al. _____ 75—174 X

OTHER REFERENCES

Transactions, American Society for Metals, Preprint No. 70 (1957), vol. 51, p. 14.

Constitution of Binary Alloys, by Hansen, 1958, p. 1022.

JOHN F. CAMPBELL, *Primary Examiner.*